Figure 1:
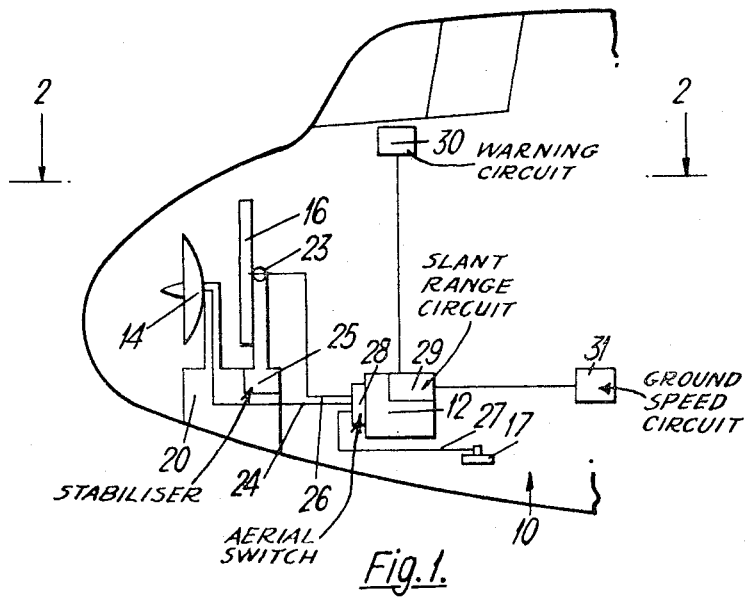

United States Patent

[11] 3,623,093

| [72] | Inventors | David Rooksby Bollard<br>North Fambridge;<br>William Alfred Jenkins, Westcliff-on-Sea,<br>both of England |
|---|---|---|
| [21] | Appl. No. | 851,577 |
| [22] | Filed | Aug. 20, 1969 |
| [45] | Patented | Nov. 23, 1971 |
| [73] | Assignee | Ekco Electronics Limited<br>Essex, England |
| [32] | Priority | Oct. 31, 1968 |
| [33] | | Great Britain |
| [31] | | 51,745/68 |

[54] RADAR INSTALLATION
24 Claims, 2 Drawing Figs.

[52] U.S. Cl. .................................................. 343/7 TA, 343/5 R
[51] Int. Cl. ................................................. G01s 9/02

[50] Field of Search ............................................ 343/5, 7 TA

[56] References Cited
UNITED STATES PATENTS

| 2,574,853 | 11/1951 | Ward | 343/7 TA UX |
| 3,277,467 | 10/1966 | Barney | 343/7 TA X |
| 3,159,834 | 12/1964 | Fiocco | 343/9 |

Primary Examiner—T. H. Tubbesing
Attorney—Beveridge & De Grandi

ABSTRACT: An airborne radar installation comprises a first aerial to monitor a first region, a second aerial to monitor a second region, a third aerial to monitor a third region, and transmitting and receiving equipment, at least the transmitting equipment being common to all said aerials, and means for sequentially operatively connecting each aerial to the common equipment during respective predetermined periods of time.

RADAR INSTALLATION

This invention relates to a radar installation, particularly but not exclusively for use in an aircraft.

In one aspect, the invention provides an airborne radar installation comprising a weather radar aerial adapted to cause a transmitted beam to angularly traverse to monitor an angular region, a stationary radar ranging aerial disposed behind the weather radar aerial, transmitting and receiving equipment, the transmitting equipment being common to all said aerials, and switch means for sequentially periodically connecting each aerial to the common equipment during respective predetermined periods of time, the radar ranging aerial being connected to the common equipment when the said beam has reached an angular extremity of its traverse.

In another aspect, the invention provides an airborne radar installation comprising a weather radar aerial adapted to cause a transmitted beam to angularly traverse to monitor an angular first region, a stationary second radar aerial adapted to monitor a second region, a stationary radar altimeter aerial adapted to monitor a third region, transmitting and receiving equipment, the transmitting equipment being common to all said aerials, and switch means for sequentially periodically connecting each aerial to the common equipment during respective predetermined periods of time, the second aerial being connected to the common equipment when the said beam has reached an angular extremity of its traverse, the radar altimeter aerial being connected to the common equipment when the said beam has reached the other angular extremity of its traverse.

The switch means may connect said radar ranging aerial to the common equipment when the weather radar aerial is substantially perpendicular to the radar ranging aerial. Alternatively, the switch means may connect the second aerial and the radar altimeter aerial alternately to the common equipment when the weather radar aerial is substantially perpendicular to the second aerial.

The weather radar aerial may be adapted to control the switch means according to the angular position of the weather radar aerial in its angular traverse. The second aerial may be a radar altimeter aerial.

In another aspect, the invention provides an aircraft having a radar installation as set forth above.

Preferably, the weather radar aerial comprises means for angularly traversing a transmitted beam to search the angular region ahead of the aircraft, the angular extent thereof being approximately in the yaw plane of the aircraft, the radar ranging aerial being directed to search a second region within the angular extent of the said angular region and below said angular region, means being provided to adjust the radar ranging aerial to maintain the second region at a predetermined angle of depression below the horizontal relative to the aircraft.

There may be means to measure the slant range from the aircraft of said second region within the angular extent of said angular region.

Preferably there are provided means to produce an indication of the clearance height at which the aircraft would overfly this second region if its flight path were to remain unchanged, and warning means adapted to operate when the said clearance height is less than a predetermined value.

There may be means operable when said clearance height is less than the predetermined value to indicate the time interval after which the aircraft would arrive over this second region if its flight path and ground speed at the time of indication were to remain unchanged.

Means may be provided to adjust the predetermined value of the clearance height proportionally to the aircraft ground speed.

Figure 2:
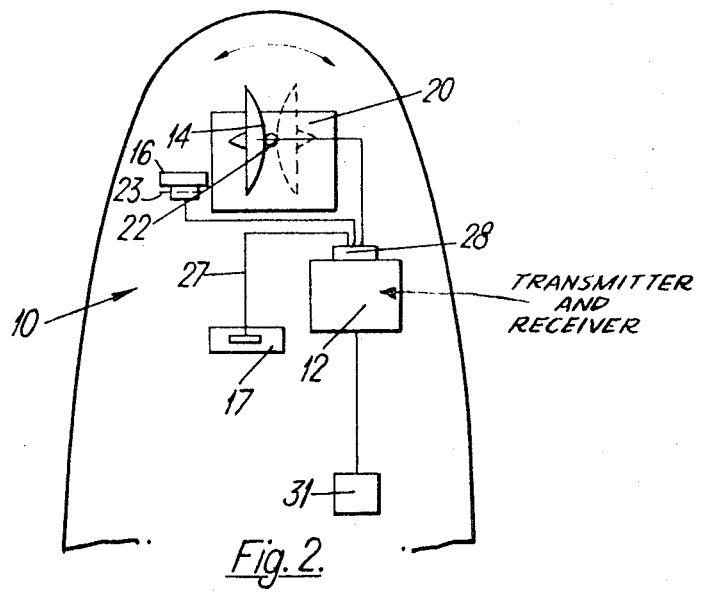

The invention will be specifically described merely by way of example with reference to the accompanying drawings wherein:

FIG. 1 shows an aircraft having a radar installation according to the invention, and FIG. 2 shows a plan view on line 2—2 of FIG. 1.

When an aircraft is in flight, it is useful to the pilot to know the clearance height of the aircraft above the region of the terrain over which it is about to fly. The term "terrain" is of course intended to include both land and sea. This information can be obtained by means of a radar installation in the aircraft which scans the region over which the aircraft is about to fly, giving an indication of the slant range of the region from the aircraft along the radar beam.

However, to provide an aircraft with a range-finding radar installation of this type has hitherto required an aerial and transmitting and receiving equipment solely for this purpose, and the cost and weight penalty associated with the installation has often been unacceptable. Also, the most convenient location in an aircraft for such a radar installation is the nose, but in normal circumstances this portion is already almost completely occupied by the aircraft's weather radar and other equipment. Consequently, forward terrain scanning installations hitherto have not been provided in the nose of an aircraft.

An object of the specifically described embodiment of the present invention, however, is to provide a forward terrain scanning device in which the weight and cost penalties may be less than hitherto and in which the forward terrain scanning aerial may be located in the nose of an aircraft together with a weather radar aerial.

Furthermore, it is a disadvantage of conventional air pressure operated altimeters as fitted to aircraft that they give an indication of the height of the aircraft above sea level, and not the height above the ground over which the aircraft is flying, unless given a false zero corresponding to the height of the ground. Since the most important ground height from the pilot's point of view is the height of the airport at which he will land, it is conventional to set a pressure altimeter to have a false zero corresponding to this height. Unfortunately, errors sometimes occur in this setting procedure and these errors have been the cause of several aircraft accidents in recent years.

Radar altimeters are not prone to the above disadvantages, since they measure the height of the aircraft above the ground over which it is flying. However, conventional radar altimeter installations have hitherto required an aerial and equipment solely for the purpose of measuring the aircraft altitude, and the cost and weight penalty involved in such an installation has often been held to be unacceptable. The specifically described embodiment of the invention may offer a solution to this disadvantage of radar altimeters.

Referring to FIGS. 1 and 2, an aircraft 10 has a radar installation comprising transmitting and receiving equipment 12, a first aerial 14, a second aerial 16 and a third aerial 17 which are all connected to the equipment 12. The equipment 12 comprises transmitting equipment common to all of the aerials 14, 16, 17.

The first aerial 14 is a conventional weather radar aerial, and is mounted by any suitable conventional means 20 to traverse about an axis 22 (FIG. 2). The first aerial 14 is thus provided to cause a transmitted radar beam to traverse an arc across the nose of the aircraft, as shown in FIG. 2, thereby scanning a first region comprising an angular sector in front of the aircraft, the angular extent of the sector being approximately in the yaw plane of the aircraft.

The second aerial 16 is a ranging aerial mounted behind the first aerial 14 and which monitors second region directly in front of the aircraft 10 and somewhat below its flight path.

The equipment 12 can thus provide information regarding the height of the aircraft relative to the terrain over which it is about to fly, by providing an indication of the slant range. The second aerial 16 is pivotally mounted so that it can be pivoted about an axis 23 in response to stabilizing equipment 25 so that it may always be directed at a predetermined angle of depression to the aircraft's flight path, regardless of the aircraft's attitude. Thus if the aircraft is flying in a nose-up attitude, the aerial 16, when seen as in FIG. 1, will be pivoted slightly. In a simpler system, the stabilizing equipment may adjust the aerial 16 so that it is always directed at a predetermined angle to the horizontal.

The aerial 17 is provided to monitor a third region which is the terrain directly below the aircraft, and to provide an indication of the height of the aircraft above that terrain. The aerial 17 may thus be termed a radar altimeter aerial.

The aerials 14, 16 and 17 are connected to the transmitting and receiving equipment 12 by respective conventional lines 24, 26, 27. Associated with the equipment 12 is an aerial switch means 28, the purpose of which will be apparent hereinafter. The aerial switch 28 is controlled by the angular position of the aerial 14 by any suitable means, e.g. limit switches.

When the first aerial 14 is at the right-hand end of its sweep, as shown in dotted lines in FIG. 2, the information it receives is of limited value to the crew of the aircraft since it relates to weather conditions abeam of the aircraft. The first aerial 14, when in the right hand extreme position of its traverse, that is to say perpendicular to the second aerial 16, does not significantly obstruct the "view" of the second aerial 16, whereas in its other traverse positions the obstruction is significant, since the aerial 16 views a region which is in front of the aerial 14.

The aerial switch means 28 is therefore controlled to sequentially operatively connect the equipment 12 to the first aerial 14 alone for those periods of time when the aerial 14 is in its intermediate traverse positions, and to connect the equipment 12 to the second aerial 16 alone during those periods of time when the first aerial 14 is at the right-hand extremity of its traverse. Thus useful information regarding the terrain over which the aircraft is about to fly is obtained, instead of the relatively useless information regarding the weather on the starboard beam of the aircraft, the terrain information being obtained using the equipment 12 which hitherto has been utilized only to provide weather information.

When the first aerial 14 is at the left-hand extremity of its traverse, the information it obtains is again of limited value. However, the "view" of second aerial 16 is now obscured, so it cannot profitably be connected to the equipment 12 at this time. Therefore, the radar altimeter aerial 17 alone is operatively connected to the equipment 12 when the first aerial is at the left-hand extremity of its sweep.

Thus useful information regarding the height of the aircraft above the terrain over which it is flying is obtained, instead of relatively useless information regarding the weather on the port beam of the aircraft.

As indicated, the equipment 12 comprises a common transmitter arranged to be connected to each aerial as required. The receiving equipment in the equipment 12 also has circuitry common to all aerials; for example at least the microwave stages of the equipment are common.

The receiving equipment has separate output stages for the function associated with each aerial. Thus, there are provided "weather radar" output stages and a suitable conventional display unit for use when the first aerial 14 is operatively connected to the equipment 12. Likewise, there are radar altimeter output stages and a display unit for use when the aerial 17 is connected to the equipment 12. Since the aerials 16 and 17 are not used simultaneously, the majority of the receiving equipment for the aerial 16 is utilized for the aerial 17. The functions of the aerial 16 and 17 are of course similar in that they both perform a ranging function in a set direction.

However, the receiving equipment also embodies output stages for example such as described and claimed in our copending U.S. Pat. application Ser. No. 851,576 for use when the aerial 16 is connected to the equipment 12. Reference may be had to U.S. Ser. No. 851,576 for details of these output stages.

The equipment 12 thus comprises circuitry 29 to measure the slant range of the second region from the aircraft when the second aerial 16 is connected to the equipment 12. The slant range, of course, is proportional to the clearance height at which the aircraft will overfly the second region if its flight path were to remain unchanged and thus there are provided means to produce an indication of the clearance height. The equipment 12 contains a warning circuit 30 incorporating an alarm in the pilot's cockpit if the clearance height is less than a predetermined value. The alarm may be an audible or visual alarm.

The circuitry 29 also receives from conventional equipment 31 a signal proportional to the aircraft ground speed, and comprises means for comparing the ground speed with the slant range of the second region to provide an indication of the time interval after which the aircraft would arrive over the second region if its flight path and speed were unchanged. Since this indication is only of interest at times when the clearance height is less than the predetermined value, the circuitry 29 is arranged to provide this indication only at such times. In order to provide a constant said time interval, the circuitry 29 comprises means to adjust the predetermined value of the clearance height is adjusted by the circuitry 29 to be proportional to the aircraft ground speed.

Although the first aerial 14 is of the mechanically traversing type, it will be appreciated that a fixed aerial having means to vary the direction of the transmitted beam could be provided instead. Thus the first aerial 14 could be of the slotted waveguide type, in which the direction of the transmitted beam is varied by electrical means.

The second aerial 16 could then be mounted above or below the first aerial 14 rather than behind it, if so desired.

Alternatively, if the second aerial 16 is mounted so that it is also relatively unobstructed when the first aerial 14 is at the left-hand extremity of its traverse then the second aerial 16 can be connected to the equipment 12 when the first aerial 14 is at both the right and left- hand extremities of its traverse. The slant range then can be measured more frequently.

The radar altimeter aerial 17 could also be connected to the equipment 12 at both ends of the traverse of the aerial 14, if desired, before or after the connection of the aerial 16.

An aircraft provided with a single set of in-built microwave conductors (e.g. to the U.S.A. "ARINC 564" standard) intended for a weather radar installation, may be provided by means of this invention with a terrain warning radar and/or a radar altimeter without the necessity of further microwave conductors being fitted.

Although it is preferable to provide receiving equipment common to all aerials, there may instead be provided respective receiving equipment for each aerial. However, the cost and weight penalties then associated with the installation are greater than when common receiving equipment is employed.

Also, one or more of the aerials 14, 16, 17 may be exclusively a transmitting aerial. One or more separate receiving aerials are then provided to receive the echo signals originating from the beam transmitted by the transmitting aerial or aerials.

We claim:

1. An aircraft radar comprising a weather radar aerial for monitoring a first region, means for continuously imparting reciprocating angular movement to said weather radar aerial so that it traverses a predetermined arc in one direction followed by the same predetermined arc in the opposite direction, a stationary radar ranging aerial for monitoring a second region, said ranging aerial being positioned with respect to said weather aerial so that the field of view of said ranging aerial is obstructed by said weather aerial except when said weather aerial is at a position at the extreme end of said predetermined arc in said one direction, transmitting and receiving means, at least said transmitting means being common to both said aerials, and switching means for sequentially and periodically connecting said weather aerial to said transmitting means during the time when said weather aerial is at a position other than at said extreme end of said predetermined arc in said one direction and for connecting said ranging aerial to said transmitting means at the time when said weather aerial is at said position at the extreme end of said arc in said one direction.

2. The radar system of claim 1 wherein said weather aerial at said position at said extreme end of said predetermined arc in said one direction faces in the starboard direction of the aircraft where the weather information is of relatively small value.

3. The radar system of claim 2 wherein said aerials and said transmitting and receiving means are installed in the nose of said aircraft, wherein said ranging aerial is positioned behind said weather aerial in said nose, and wherein said weather aerial is perpendicular to said ranging aerial at said position at the extreme end of said predetermined arc in said one direction.

4. The radar system of claim 3 wherein said weather aerial moves in the yaw plane of said aircraft and is directed so that said first region monitored is substantially ahead of the aircraft and has an angular extent corresponding to said predetermined arc, and wherein said ranging aerial is directed so that said second region monitored is a region of terrain within the angular extent of said first region and below said first region.

5. The radar system of claim 4 further including means for automatically adjusting said ranging aerial to maintain said region of terrain monitored at a predetermined angle of depression below the horizontal relative to the aircraft.

6. The radar system of claim 5 further including means to measure the slant range from the aircraft of said region of terrain viewed.

7. The radar system of claim 6 further comprising means to compute the clearance height at which the aircraft would overfly said region of terrain if its flight path were to remain unchanged, and warning means arranged to operate when said clearance height is less than a predetermined value.

8. An aircraft radar comprising a weather radar aerial for monitoring a first region, means for continuously imparting reciprocating angular movement to said weather radar aerial so that it traverses a predetermined arc in one direction followed by the same predetermined arc in the opposite direction, a stationary radar ranging aerial for monitoring a second region, a stationary radar altimeter aerial for monitoring a third region, transmitting and receiving means, at least said transmitting means being common to all said aerials and switching means for sequentially and periodically connecting said weather aerial to said transmitting means during the time when said weather aerial is at a position in between the extreme ends of said predetermined arc, and for connecting said ranging aerial to said transmitting means at the time when said weather aerial is at said position at the extreme end of said predetermined arc in said one direction and for connecting said altimeter aerial to said transmitting means when said weather aerial is at said position at the extreme end of said predetermined arc in said opposite directions.

9. The radar system of claim 8 wherein said ranging aerial is positioned so that its field of view is obstructed by said weather aerial except when said weather aerial is at said position at said extreme end of said predetermined arc in said one direction.

10. The radar system of claim 9 wherein said weather aerial at said position at said extreme end of said predetermined arc in said one direction faces in the starboard direction of the aircraft and in said position at said extreme end of said predetermined arc in said opposite direction faces in the port direction of the aircraft and wherein the weather information in the starboard and port direction is of relatively small value.

11. The radar system of claim 10 wherein said weather aerial moves in the yaw plane of said aircraft and is directed so that said first region monitored is substantially ahead of the aircraft and has an angular extent corresponding to said predetermined arc and wherein said ranging aerial is directed so that said second region monitored is a region of terrain within the angular extent of said first region and below said first region and wherein said altimeter aerial is directed so that the third region monitored 12. An aircraft radar comprising an angularly traversing weather radar aerial for monitoring an angular region, a nontraversing radar ranging aerial disposed behind the weather radar aerial, transmitting and receiving equipment, the transmitting equipment being common to all said aerials, and switch means for sequentially periodically connecting each aerial to the common equipment during respective predetermined periods of time, the radar ranging aerial being connected to the common equipment when the said weather radar aerial has reached an angular extremity of said traverse.

13. An aircraft radar comprising an angularly traversing weather radar aerial for monitoring an angular first region, a nontraversing second radar aerial adapted to monitor a second region, a nontraversing altimeter aerial adapted to monitor a third region, transmitting and receiving equipment, the transmitting equipment being common to all said aerials, and switch means for sequentially periodically connecting each aerial to the common equipment during respective predetermined periods of time, the second aerial being connected to the common equipment when the said weather radar aerial has reached an angular extremity of said traverse, the radar altimeter aerial being connected to the common equipment when the said weather radar aerial has reached the other angular extremity of said traverse.

14. An aircraft radar as claimed in claim 12 in which the switch means connects said radar ranging aerial to the common equipment when the weather radar aerial is substantially perpendicular to the radar ranging aerial.

15. An aircraft radar as claimed in claim 13 in which the switch means connects the second aerial and the radar altimeter aerial alternately to the common equipment when the weather radar aerial is substantially perpendicular to the second aerial.

16. An aircraft radar as claimed in claim 13 wherein the weather radar aerial is adapted to control the switch means according to the angular position of the weather radar aerial in its angular traverse.

17. An aircraft radar as claimed in claim 13 wherein the second aerial is a radar altimeter aerial.

18. An aircraft provided with a radar installation comprising an angularly traversing weather radar aerial for monitoring an angular region, a nontraversing radar ranging aerial disposed behind the weather radar aerial, transmitting and receiving equipment, the transmitting equipment being common to all said aerials, and switch means for sequentially periodically connecting each aerial to the common equipment during respective predetermined periods of time, the radar ranging aerial being connected to the common equipment when the said weather radar aerial has reached an angular extremity of said traverse.

19. An aircraft as claimed in claim 18 wherein the weather radar aerial monitors an angular region ahead of the aircraft, the angular extent thereof being approximately in the yaw plane of the aircraft, the radar ranging aerial being directed to monitor a second region within the angular extent of the said angular region and below said angular region, means being provided to adjust the radar ranging aerial to maintain the second region at a predetermined angle of depression below the horizontal relative to the aircraft.

20 An aircraft as claimed in claim 19 comprising means to measure the slant range from the aircraft of said second region within the angular extent of said angular region.

21. An aircraft as claimed in claim 20 comprising means to produce an indication of the clearance height at which the aircraft would overfly this second region if its flight path were to remain unchanged, and warning means adapted to operate when the said clearance height is less than a predetermined value.

22. An aircraft radar as claimed in claim 22 wherein the weather radar aerial is adapted to control the switch means according to the angular position of the weather radar aerial in its angular traverse.

23. An aircraft provided with a radar installation comprising an angularly traversing weather radar aerial for monitoring an angular first region, a nontraversing second radar aerial adapted to monitor a second region, a nontraversing altimeter aerial adapted to monitor a third region, transmitting and receiving equipment, the transmitting equipment being common to all said aerials, and switch means for sequentially periodically connecting each aerial to the common equipment during respective predetermined periods of time, the second aerial being connected to the common equipment when the said beam has reached an angular extremity of said traverse, the radar altimeter aerial being connected to the common equipment when the said weather radar aerial has reached the other angular extremity of said traverse.

24. An aircraft as claimed in claim 23 wherein the weather radar aerial monitors an angular region ahead of the aircraft, the angular extent thereof being approximately in the yaw plane of the aircraft, the second radar aerial being directed to monitor the second region within the angular extent of said angular region and below said angular region, means being provided to adjust the second aerial to maintain the second region at a predetermined angle of depression below the horizontal relative to the aircraft.

* * * * *

UNITED STATES PATENT OFFICE
CERTIFICATE OF CORRECTION

Patent No. 3,623,093　　　　　　　Dated November 23, 1971

Inventor(s) BOLLARD, DAVID ROOKSBY and JENKINS, WILLIAM ALFRED

It is certified that error appears in the above-identified patent and that said Letters Patent are hereby corrected as shown below:

On the cover page, beneath the filing date and Serial Number the following should be inserted.

"Claims priority, applications Great Britain, August 21, 1968, October 31, 1968, 40083/68 and 51745/68".

Signed and sealed this 30th day of May 1972.

(SEAL)
Attest:

EDWARD M. FLETCHER, JR.　　　　　ROBERT GOTTSCHALK
Attesting Officer　　　　　　　　Commissioner of Patents